United States Patent

Streiff et al.

[11] Patent Number: 5,865,537
[45] Date of Patent: Feb. 2, 1999

[54] MIXING DEVICE FOR MIXING A LOW-VISCOSITY FLUID INTO A HIGH-VISCOSITY FLUID

[75] Inventors: Felix Streiff, Winterthur; Andreas Walder, Dübendorf; Arno Signer, Wiesendangen, all of Switzerland

[73] Assignee: Sulzer Chemtech AG, Winterthur, Switzerland

[21] Appl. No.: 723,056

[22] Filed: Sep. 30, 1996

[30] Foreign Application Priority Data

Oct. 5, 1995 [EP] European Pat. Off. .............. 95810630

[51] Int. Cl.⁶ .............................. B01F 5/06; B01F 15/02; B01F 15/06
[52] U.S. Cl. ...................... 366/174.1; 366/144; 366/137; 366/178.3; 366/181.5; 366/337
[58] Field of Search ...................................... 366/144, 149, 366/136, 137, 159.1, 160.1–160.3, 162.1, 167.1, 174.1, 175.2, 176.1, 178.1, 178.3, 181.5, 336–340; 165/109.1

[56] References Cited

U.S. PATENT DOCUMENTS

| | | | |
|---|---|---|---|
| 2,831,754 | 4/1958 | Manka | 366/178.1 X |
| 4,068,830 | 1/1978 | Gray | 366/175.2 |
| 4,211,277 | 7/1980 | Grosz-Roll et al. | 165/109.1 |
| 4,408,890 | 10/1983 | Beckman | 366/339 X |
| 4,753,535 | 6/1988 | King | 366/337 |
| 5,176,448 | 1/1993 | King et al. | 366/339 X |

FOREIGN PATENT DOCUMENTS

| | | |
|---|---|---|
| 0 472 491 | 9/1992 | European Pat. Off. . |
| 2 315 114 | 10/1974 | Germany . |
| WO 92/16345 | 10/1992 | WIPO . |

OTHER PUBLICATIONS

Patent Abstracts of Japan, vol. 950 No. 004, & JP–A–07 100825 (Denki Kagaku Kogyo KK), Apr. 18,, 1995. Abstract.

Patent Abstracts of Japan, vol. 005, No. 094 (C–059), Jun. 19, 1981 & JP–A–56 038125 038125 (Toray Ind. Inc.) Apr. 13, 1981. Abstract.

*Primary Examiner*—Charles E. Cooley
*Attorney, Agent, or Firm*—Townsend and Townsend and Crew LLP

[57] ABSTRACT

A mixing device for mixing a low-viscosity fluid into a high-viscosity fluid comprises the following parts: a main line for carrying the high-viscosity fluid and having inbuilt static mixing units of a main mixer; a branch line for a branch flow which is routed from the main line to the inlet of the main mixer, the main line and branch line of the main mixer being constructed from pipe sections with essentially parallel axes; a pump located in the branch line; a static auxiliary mixer at the end of the branch line; and a nozzle at the inlet to the auxiliary mixer for feeding in the low-viscosity fluid.

7 Claims, 2 Drawing Sheets

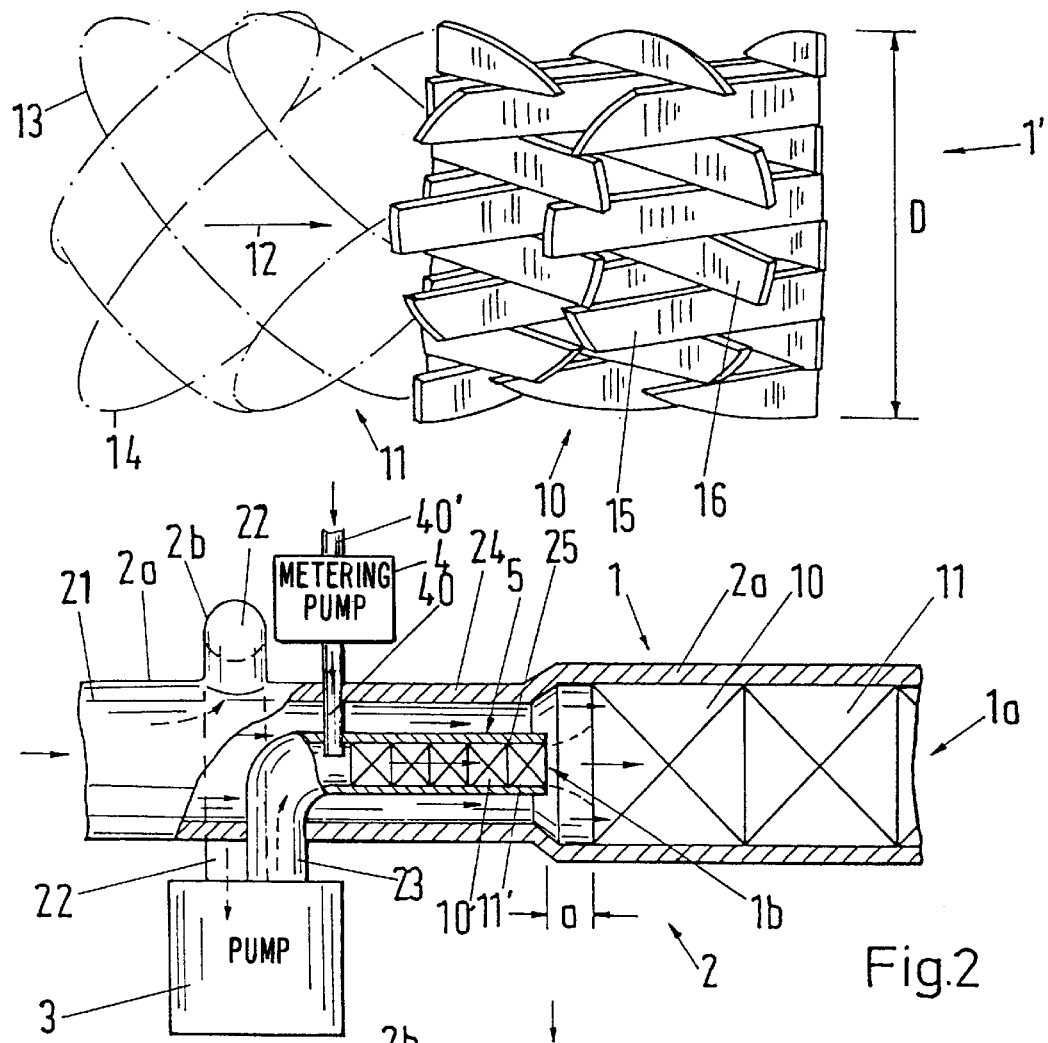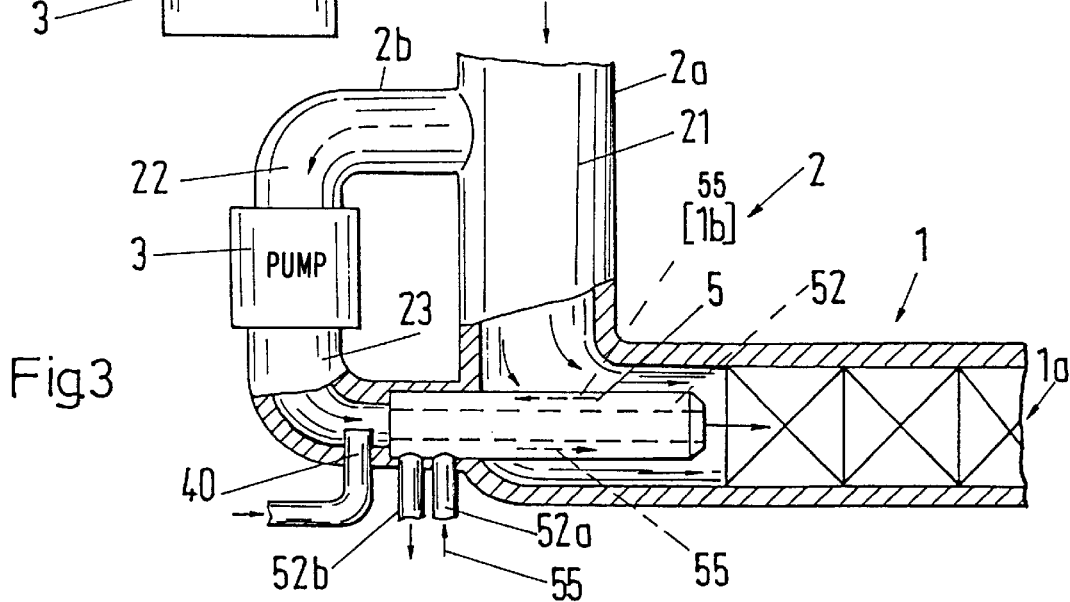

MIXING DEVICE FOR MIXING A LOW-VISCOSITY FLUID INTO A HIGH-VISCOSITY FLUID

BACKGROUND OF THE INVENTION

1. Field of the Invention

The invention relates to a mixing device for mixing a low-viscosity fluid into a high-viscosity fluid. The high-viscosity fluids envisaged are primarily polymer melts; the low-viscosity fluids are primarily additives that are to be incorporated into polymer melts. The additive can be both soluble and insoluble in the melt. The difference in the viscosities of the fluids is generally very large; the viscosities can differ by a factor of two or more orders of magnitude. Both liquids and gases can be used as low-viscosity fluids. The high-viscosity fluids can contain solids. The invention also relates to processes that can be performed with the device.

2. Description of the Prior Art

A method for mixing liquids with greatly differing viscosities is known from DE-PS 23 15 114. With this method, the low-viscosity fluid is pre-mixed with a branch flow of the high-viscosity fluid using a dynamic mixer. The resulting pre-mixture is combined with the non-branched off part of the flow of the high-viscosity fluid and the entire flow is then mixed further in a static mixer. The known process can be used to advantage when incorporating low-viscosity additives into polymer melts, since it is possible for the additives to be mixed in homogeneously and gently, i.e. without severe shear stressing of the polymer. According to the teaching of DE-PS 23 15 114, the results obtained from mixing processes using only gentle-action static mixers are very unsatisfactory.

The use of dynamic mixers is, however, very costly and maintenance-intensive; and some degradation of the polymers has to be accepted in such mixers owing to the shearing and warming due to the stirring motion. The problem underlying the invention is thus to devise a mixing device which manages without dynamic mixers and permits homogeneous mixing of low-viscosity additives into polymer melts.

SUMMARY OF THE INVENTION

The present invention of a mixing device for mixing a low-viscosity fluid into a high-viscosity fluid consists of the following parts: a main line for carrying the high-viscosity fluid and having inbuilt static mixing units of a main mixer; a branch line for a branch flow which is routed from the main line to the inlet of the main mixer, the main line and branch line of the main mixer being constructed from pipe sections with essentially parallel axes; a pump located in the branch line; a static auxiliary mixer at the end of the branch line; and a nozzle at the inlet to the auxiliary mixer for feeding in the low-viscosity fluid.

An important advantage of the method of the invention in comparison with the known methods lies in the fact that the auxiliary mixer can be constructed as a heat exchanger. The energy dissipated during mixing can be extracted continuously by means of a coolant, so that a degradation of the polymers can be largely avoided.

BRIEF DESCRIPTION OF THE DRAWINGS

FIG. 1 shows the mixing element of a known static mixer;

FIG. 2 shows a cross-sectional view of an initial device of the invention;

FIG. 3 shows a cross-sectional view of a device with a knee-shaped main pipe;

DETAILED DESCRIPTION OF THE PREFERRED EXEMPLARY EMBODIMENTS

Figure 4:
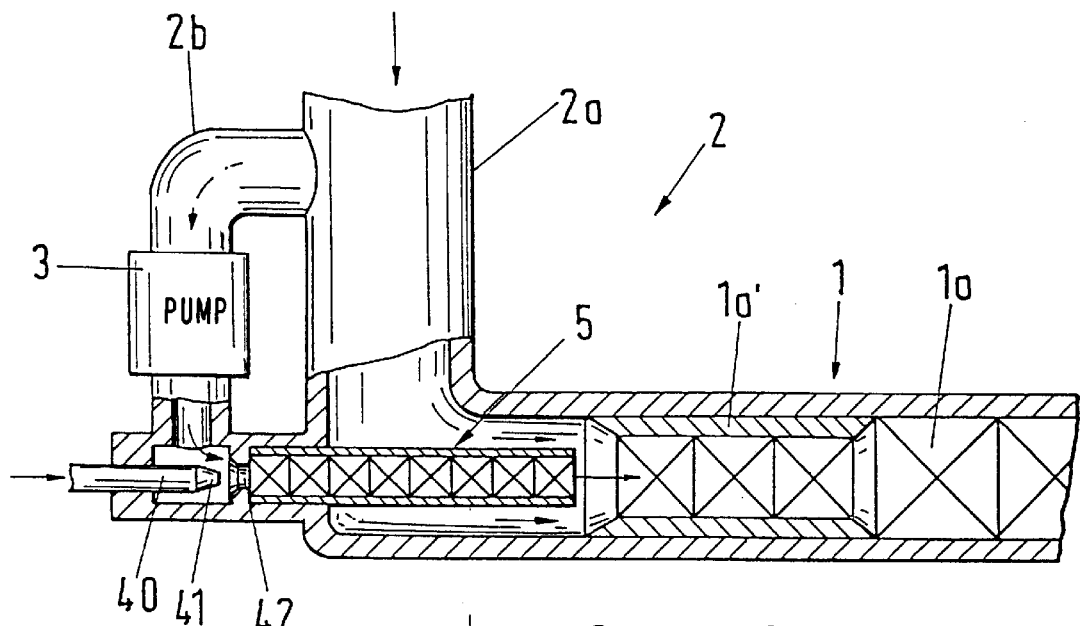
FIG. 4 shows a cross-sectional view of a variation of the device in FIG. 3.

The mixing element 10 in FIG. 1 has a structure which consists of intermeshing, criss-crossing plates 15, 16 forming two groups of structure elements arranged in parallel. An adjacent mixing element 11 is indicated by dash-dotted lines. Elliptical lines 13, 14 indicate the surfaces bounded by plates not shown in the drawing. The surfaces bounded by 13 and 14 cross each other. The two mixing elements 10 and 11 are identical, but the one is rotated relative to the other through 90° about the longitudinal axis. The longitudinal axis runs in the direction of arrow 12 which indicates the main direction of flow. A plurality of cascaded mixing elements 11, 10 form the mixing baffles 1' of a static mixer. The diameter of the mixing elements is indicated by D.

The mixing device 2 of the invention in FIG. 2 comprises the following parts: a pipe 21 which forms the main line 2a; a branch line 2b which is formed by pipe sections 22, 23 and 25 and a pump 3, the pump 3—preferably a gear pump—being provided for delivering high-viscosity fluid; a main mixer 1 in main line 2a with inbuilt static mixing units 1a (mixing elements 10, 11); an auxiliary mixer 5 located at the end of secondary line 2b and comprising a pipe section 25 and inbuilt static mixing units 1b (mixing elements 10', 11'); and a metering pump 4 for low-viscosity fluid with a supply line 40' and a feed nozzle 40 at the inlet to auxiliary mixer 5. The main mixer can be constructed as a heat exchanger in such a way that main pipe 21 takes the form of a double jacket (not illustrated) in the area of mixing units 1a.

Pipe section 25 is located coaxially in side pipe section 24 which forms part of main pipe 21. Pipe section 25 can be positioned eccentrically relative to pipe section 24, but is generally aligned along a parallel axis. Pipe section 22 branching off from main pipe 21 forms a bend lying in a plane perpendicular to main line 2a. Less than 50%, and preferably 10 to 15%, of the higher-viscosity fluid is branched off from main line 2a into branch line 2b.

Pipe section 23 which forms a knee-shaped bend connects pump 3 with auxiliary mixer 5 through the wall of main pipe 21. Auxiliary mixer 5, which includes mixing elements 1b provides a significantly higher shearing of the fluid mixture than does main mixer 1. The speed of flow in auxiliary mixer 5 is therefore generally greater than in the main flow between the two pipe sections 24 and 25. In this case, the flow of fluid emerging from secondary mixer 5 broadens as it passes into main mixer 1 (indicated by dashed lines).

The nozzle 40 preceding auxiliary mixer 5 is used to feed in the low-viscosity fluid and is positioned transverse to the direction of flow of the high-viscosity fluid.

The high-viscosity fluid is for example a polymer melt. The low-viscosity fluid can be a liquid or gaseous additive. In auxiliary mixer 5, this additive is dispersed in droplet or bubble form into the high-viscosity fluid of branch line 2b.

The distance a between the outlet of auxiliary mixer 5 and the inlet of main mixer 1 must be as small as possible: i.e. smaller than twice the diameter D of the inbuilt mixing units 1b in auxiliary mixer 5. If the distance a is too large, the mixture will segregate and some of the droplets or bubbles will coalesce again.

The dispersion generated in auxiliary mixer 5 is mixed in the main mixer 1 with the fluid of main line 2a. A dwell time is provided in the main mixer 1 to facilitate an at least partial dissolution of the low-viscosity additive as a result of diffusion out of the droplets or bubbles into the high-viscosity fluid.

The second embodiment of the mixing device 2 of the invention shown in FIG. 3 differs from the device set out in FIG. 2 firstly by the knee shape of the main pipe 21. Secondly, auxiliary mixer 5 is constructed as a heat exchanger having connection pipes 52a and 52b and a conduit system 52 for a coolant (arrows 55). The secondary line 2b and main line 2a lie in a common plane.

In the variant depicted in FIG. 4, device 2 has a two-part main mixer 1 which consists of a pre-mixer 1a' and a post-mixer whose inbuilt mixing units 1a have a greater diameter than those of the pre-mixer. Two-part mixers of this type are known from EP-PS 0 472 491 (see also M. Fleischli et al "Neue Erkenntnisse zum Mischen und Dispergieren von Flüssigkeiten mit grossen Viskositätsunterschieden in statischen Mischern" (New Findings on Mixing and Dispersing Fluids with Large Viscosity Differences in Static Mixers), Chem.-Ing.-Tech. 1990, pages 650–654). In pre-mixer 1a' fine droplets or bubbles of the additive are generated by increased shearing. The additive is dissolved and mixed in the post-mixer over a relatively long mixing time. Tip 41 of feed nozzle 40 lies essentially parallel to the direction of flow of the high-viscosity fluid. Located between nozzle 40, which is used to feed in the low-viscosity fluid, and auxiliary mixer 5 is an aperture 42. Nozzle tip 41 is tapered. An admixing device of this kind complete with aperture is also known from EP-PS 0 472 491.

Figure 5:
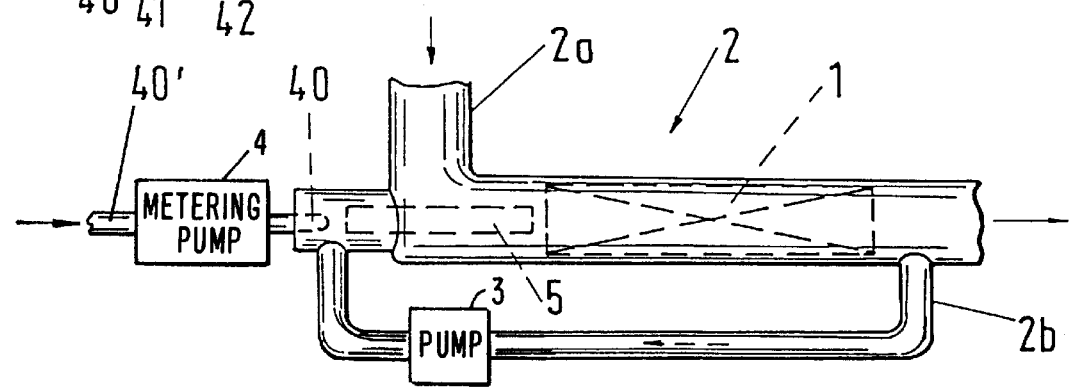
FIG. 5 shows a further embodiment of the device of the invention.

FIG. 5 shows a mixing device 2 in which branch line 2b is constructed as a return path. With this embodiment it may be advantageous to branch off more than 20% of the main flow. Due to the use of the return flow, a smaller amount of low-viscosity fluid (additive) needs to be added in auxiliary mixer 5 than is the case with the other examples of embodiments described. This is advantageous since the tendency for the mixture to segregate at the output of auxiliary mixer 5 is less great.

A pressure differential of 20 to 60 bar is generated in main mixer 1 when the mixing device 2 of the invention is in operation. A driving pressure differential of 80 to 200 bar is generated for auxiliary mixer 5 by pump 3 of branch line 2b.

What is claimed is:

1. A mixing device for mixing two fluids of differing viscosities comprising:
    a main line that includes a main mixer that includes at least one inbuilt static mixing unit, an inlet, and an outlet;
    a branch line routed from the main line consisting of a pump and a static auxiliary mixer that includes at least one inbuilt static mixing unit, an inlet, and an outlet, wherein the outlet of the branch line lies within the main line so that a main flow encircles the outlet of the branch line;
    wherein the main line and the branch line are constructed of nested pipe sections whose central axes are one of either coaxial or substantially parallel and eccentric; and
    wherein the distance between the outlet of the static auxiliary mixer and the inlet of the main mixer is smaller than twice the diameter of the inbuilt static mixing unit of the static auxiliary mixer.

2. The device according to claim 1 wherein the branch line branches off from the main line upstream of the main mixer.

3. The device according to claim 1 wherein the main line includes a knee-shaped bend preceding the main mixer and wherein the auxiliary mixer is located in the area of the knee-shaped bend of the main line.

4. The device according to claim 1 wherein the auxiliary mixer is constructed as a heat exchanger.

5. The device according to claim 1 wherein a feed nozzle within the branch line for supplying one of the fluids is located transverse to a direction of flow of a second of the fluids.

6. The device according to claim 5 wherein a tip of the feed nozzle lies essentially along a direction of flow of the second of the fluids and wherein an aperture is located between the feed nozzle and the auxiliary mixer.

7. The device according to claim 1 wherein the main mixer incorporates a pre-mixer and a post-mixer that includes inbuilt units having a larger diameter than the pre-mixer.

* * * * *